Figure 1:
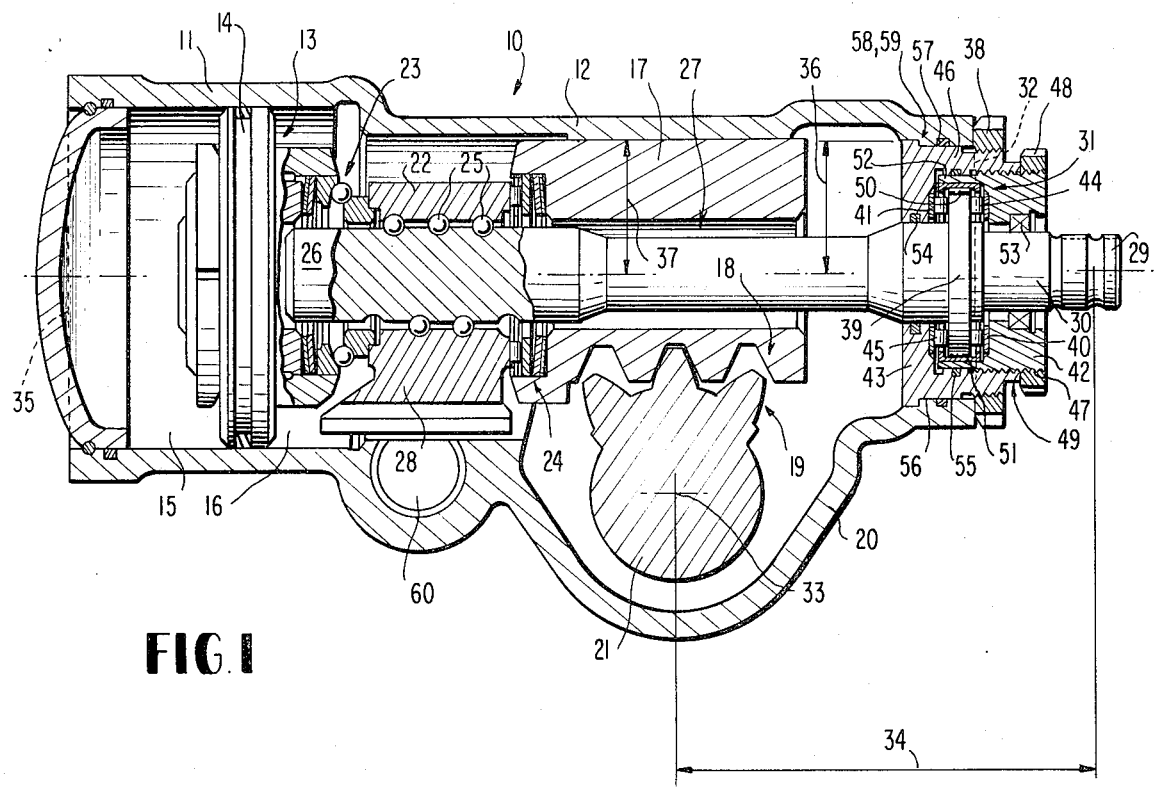

United States Patent [19]
Forster et al.

[11] 3,796,139
[45] Mar. 12, 1974

[54] SERVO STEERING FOR VEHICLES

[75] Inventors: Hans-Joachim M. Forster; Klaus Katz, both of Stuttgart; Anton Scheuter, Aichschiess, all of Germany

[73] Assignee: Daimler-Benz Aktiengesellschaft, Stuttgart-Unterturkheim, Germany

[22] Filed: Dec. 3, 1971

[21] Appl. No.: 204,489

[30] Foreign Application Priority Data
Dec. 5, 1970  Germany............................ 2060022

[52] U.S. Cl. .................................. 92/136, 308/234
[51] Int. Cl. ............................................. F01b 9/10
[58] Field of Search ............ 92/116; 91/380, 375 A, 91/375 R, 374, 370, 371, 372, 373; 308/234

[56] References Cited
UNITED STATES PATENTS

| 3,602,101 | 8/1971 | Jablonsky et al. .................... 91/434 |
| 2,936,739 | 5/1960 | Levensteins et al. ................. 91/371 |
| 3,003,836 | 10/1961 | Hill .................................. 308/234 |
| 3,080,199 | 3/1963 | Rickley .............................. 308/234 |
| 3,476,203 | 11/1969 | Forster et al. ....................... 91/380 |

FOREIGN PATENTS OR APPLICATIONS

| 889,176 | 2/1962 | Great Britain ...................... 308/234 |

Primary Examiner—Paul E. Maslousky
Attorney, Agent, or Firm—Craig and Antonelli

[57] ABSTRACT

A servo-steering mechanism for vehicles with a steering gear housing which is constructed as pressure medium cylinder and is subdivided into a wide cylinder section for the effective piston pressure surfaces acted upon by the pressure medium and into an axially adjoining narrow cylindrical section for the guidance of the working piston; the steering shaft which is in driving connection with the working piston is supported in the narrow cylinder section, while the inner end of the steering worm is helically movably connected with the working piston and the other end of the steering worm extends through the steering gear housing by means of a bearing arrangement constructed as radial support as well as axially non-displaceable bearing of the steering worm; the bearing arrangement of the steering worm is thereby inserted into the narrow cylindrical section and is equipped with two adjusting rings connected directly with each other by a threaded connection which are each provided with a radially extending abutment surface for the axial bearing support of the steering worm; detachable means, for example, in the form of a nut, are provided between the adjusting rings whereby the outer diameters of the latter are at most equal to the inner diameter of the narrow cylinder section.

17 Claims, 2 Drawing Figures

PATENTED MAR 12 1974  3,796,139

SERVO STEERING FOR VEHICLES

The present invention relates to a servo-steering system for vehicles, with a steering gear housing constructed as pressure medium cylinder and subdivided into a wide cylinder section for the effective piston pressure surfaces acted upon by the pressure medium as well as into an axially adjoining narrow cylinder section for the guidance of the working piston, and in which the steering shaft in driving connection with the working piston is supported in the narrow cylinder section while the inner end of the steering worm is spirally movably connected with the working piston and the other end of the steering worm extends toward the outside through the steering gear housing by means of a bearing arrangement constructed for the radial support as also for the axially non-displaceable bearing support of the steering worm.

The aim of the present invention resides in providing a servo-steering mechanism of the aforementioned type which is easy to assemble and which may also be utilized in connection with commercial types of vehicles such as trucks with a tiltable driver cab without increased expenditures. The underlying problems are solved according to the present invention in that the bearing arrangement of the steering worm for extending through the steering gear housing is inserted into the narrow cylinder section and includes two adjusting rings directly threadably connected with each other, each provided with a radially extending abutment surface for the axial bearing of the steering worm, and in that detachable fastening means are provided between the adjusting rings and the outer diameters of the adjusting rings are at most equal to the inner diameter of the narrow cylinder section.

The servo-steering mechanism according to the present invention is characterized in that working piston, steering nut, steering worm and bearing arrangement of the steering worm form a structural unit adapted to be preassembled, which is inserted into the steering gear housing through the opening of the wide cylinder section and in which the coupling pin of the steering worm on the outside of the housing has the smallest possible spacing from the steering shaft. The latter feature produces the advantage that with a tiltable driver cab, no additional deflecting transmission means are necessary for the steering system.

According to a structurally advantageous further development of the servo-steering mechanism according to the present invention, provision is made that one adjusting ring has an external cylindrical centering surface which is inserted into a corresponding inner cylindrical centering surface of the narrower cylinder section. With this arrangement, a separate bearing cover for the steering worm extension out of the housing is not necessary.

For achieving an effective seal between the bearing arrangement and the steering housing, it is proposed in a further development of the servo-steering mechanism according to the present invention that the one adjusting ring is provided with at least one external ring seal or with an external cylindrical sealing surface which cooperates with a corresponding counter sealing surface or sealing ring of the narrow cylinder section, and in that the adjusting ring is provided on the side of its ring seal or sealing surface facing the interior space of the narrow cylinder section with a radially extending abutment surface which abuts at a counter abutment surface of the narrow cylinder section. Due to the sealing effect of the abutment surfaces, appropriately to be clamped against one another, a pressure decrease is already enforced upstream of the sealing place, properly speaking, so that the sealing place is relieved.

In order to avoid that even after the installation of the pre-assembled gear unit into the steering gear housing, the bearing adjustment of the steering worm bearing support can be changed, the arrangement is so made according to a further feature of the present invention that the means for the mutual clamping or fixing of the adjusting rings are disposed in the interior space of the narrow cylinder section. Such a servo-steering mechanism can be constructed axially shorter than an arrangement in which the fixing means are accessible at the steering gear housing from the outside and in which one adjusting ring has to be provided with key faces for the assembly of the clamping or fixing means which increase the structural length.

Accordingly, it is an object of the present invention to provide a servo-steering mechanism for vehicles which avoids by simple means the aforementioned shortcomings and drawbacks encountered in the prior art.

Another object of the present invention resides in a servo-steering mechanism for vehicles which can be utilized also for commercial types of vehicles, especially also with trucks having tiltable driver cabs.

A further object of the present invention resides in a servo-steering system of the type described above in which working piston, steering nut, steering worm and bearing arrangement of the steering worm form a structural unit adapted to be pre-assembled which can be inserted as preassembled unit into the steering gear housing.

A still further object of the present invention resides in a servo-steering system of the type described above which obviates the need of deflecting transmission means when used with trucks having tiltable driver cabs.

Another object of the present invention resides in a servo-steering mechanism which assures an effective seal between bearing arrangement and steering gear housing, yet utilizes relatively simple parts that can be readily manufactured and assembled.

A further object of the present invention resides in a servo-steering mechanism in which the sealing place between bearing arrangement and steering gear housing is far-reachingly relieved from pressure forces due to a pressure decrease that takes place upstream thereof.

Still another object of the present invention resides in a servo-steering mechanism of the type described above in which the bearing adjustment of the pre-assembled unit can be re-adjusted even after the installation of the pre-assembled unit.

Still another object of the present invention resides in a servo-steering system for vehicles which is relatively compact in construction, excels by its short structural length in the axial direction and utilizes relatively few parts which can be readily assembled and disassembled.

Figure 2:
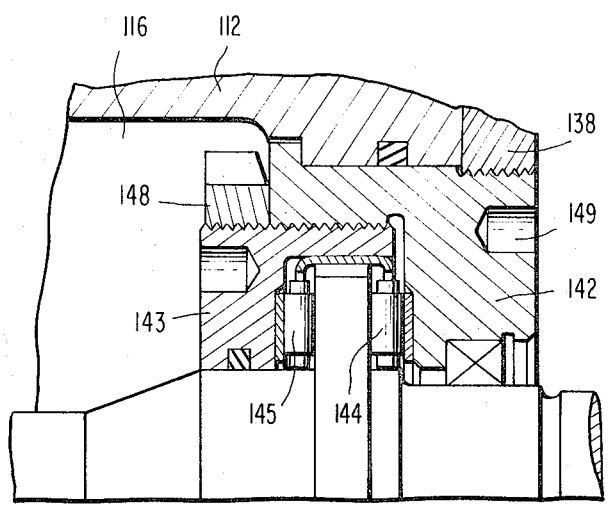

These and further objects, features and advantages of the present invention will become more apparent from the following description when taken in connection with the accompanying drawing which shows, for purposes of illustration only, two embodiments in accordance with the present invention, and wherein:

FIG. 1 is an axial cross-sectional view through the steering gear housing of a first embodiment of a servo-steering mechanism in accordance with the present invention; and FIG. 2 is a partial axial cross-sectional view, on an enlarged scale, through the bearing arrangement of the steering worm on the housing side of a second embodiment in accordance with the present invention which as to the remains parts is identical with the first embodiment.

Referring now to the drawing, and more particularly to FIG. 1, the steering gear housing generally designated by reference numeral 10 is constructed as pressure medium cylinder and is subdivided axially into a wide cylinder section 11 and into a narrow cylinder section 12. The working piston generally designated by reference numeral 13 and displaceably guided in the steering gear housing 10 includes a wide piston collar 14 which slides within the wide cylinder section 11 and subdivides the interior space of the steering gear housing 10 into the two working pressure spaces 15 and 16. The working piston 13 is provided with a narrow guide shank 17 which is guided in the narrow cylinder section 12 and is provided with a toothed rack profile 18, into which engages a toothed segment 19 of a steering shaft 21 supported in a housing bulge 20 of the narrow cylinder section 12.

A steering nut 22 is rotatably and axially non-displaceably supported in the working piston 13 by way of two roller bearings generally designated by reference numerals 23 and 24 and more particularly in such a manner as to leave a predetermined damping play. The steering nut 22 is spirally movably connected by means of a ball circulation 25 of conventional construction with the inner end 26 of a steering worm 27 and is provided with a rigid radial control arm 28 that actuates a control slide valve 60 for the control of the working pressure in the spaces 15 and 16. Since the control slide valve 60 and its operation is of known construction and forms no part of the present invention, a detailed description thereof is dispensed with herein. The outer end 30 of the steering worm 27 terminating in a coupling pin 29 extends through the steering gear housing 10 by means of the bearing arrangement generally designated by reference numeral 31 which is inserted into the end face aperture 32 of the narrow cylinder section 12. By reason of this steering worm arrangement, the coupling pin 29 has a spacing 34 from the axis 33 of the steering shaft 21 that is considerably smaller than with a servo-steering mechanism in which the steering shaft end 30 and the bearing arrangement 31 are provided at the end face aperture 35 of the wide cylinder section 11. By reason of the small distance 34, the servo-steering mechanism according to the present invention is also suited for vehicles with a tiltable driver cab.

The largest external radius 36 of the bearing arrangement 31 is smaller by a predetermined installation tolerance than the inner radius 37 of the narrow cylinder section 12 so that with the exception of the larger lock nut 38, the complete bearing arrangement 31 together with the steering worm 27, the steering nut 22 and the working piston 13 can be inserted into the steering gear housing 10 as pre-assembled unit through the end face aperture 35.

The bearing arrangement 31 is provided on both sides of a collar 39 of the steering worm end 30 with an adjusting ring 42 and 43, each provided with a radially extending abutment surface 40 and 41, respectively. One axial roller bearing 44 and 45 each are provided between the collar 39 and the abutment surfaces 40 and 41, respectively, for the axial fixing and bearing support of the steering worm 27. The adjusting ring 43 is equipped with a radially outwardly disposed, threaded socket 46, into which is screwed the other adjusting ring 42 provided with an external thread 47. After the adjustment of the bearing friction in the axial bearings 44 and 45 is made by means of the threaded connection 46, 47, the two adjusting rings 42 and 43 are locked with respect to each other by the nut 48. During the loosening or tightening of the externally accessible nut 48 after the installation of the preassembled unit, the adjusting ring 43 has to be secured against rotation. For this purpose, key surfaces 49 are provided at the socket 46 which are also accessible from the outside.

Radial bearing needles 50 run directly on the circumferential surface of the collar 39, whose cage 51 is inserted into a cylindrical bearing socket 52 of the adjusting ring 42.

The adjusting rings 42 and 43 are sealed by one radial inner ring seal 53 and 54 each with respect to the steering worm end 30 whereas for the mutual sealing of the adjusting rings, a ring seal 55 is arranged concentrically between the threaded socket 46 and the bearing socket 52.

For purposes of centering and sealing the bearing arrangement 31 with respect to the narrow cylinder section 12, an external cylindrical centering surface 56 is provided at the adjusting ring 43 which is inserted into the end aperture 32 and cooperates with a ring seal 57 inserted into the cylindrical section. The adjusting ring 43 is provided with a radial abutment surface 58 on the side of the ring seal 57 facing the pressure space 13, which abuts at a counter abutment surface 59 of the cylindrical section 12. The surfaces 58 and 59 are clamped against one another by means of the nut 38 threadably connected with an external thread of the threaded socket 46. In this manner, a pressure relief for the ring seal 57 is attained.

In the embodiment of FIG. 2, in which similar parts are designated by corresponding reference numerals of the one hundred series, as sole difference with respect to the servo-steering mechanism of FIG. 1, only the nut 148 for the mutual locking of the two adjusting rings 142 and 143 is arranged in the interior space 116 of the narrow cylinder section 112. As a result thereof, the bearing adjustment of the axial bearings 144 and 145 can no longer be changed from the outside after the fastening of the outer nut 138. Axial key openings 149 which are provided in the ring 142 for the counter-retention of the adjusting ring 142 during the loosening and tightening of the nut 148, do not require any special structural length at the ring.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A servo-steering mechanism for vehicles with a steering gear housing means constructed as a pressure medium cylinder and subdivided into a wide cylinder section for the effective pressure surfaces of a working piston means acted upon by pressure medium and into an axially adjoining narrow cylinder section for the guidance of the working piston means, in which a steering shaft operatively connected with the working piston means is supported in the narrow cylinder section, and in which an inner end of a steering worm means is spirally movably connected with the working piston means while the other end of the steering worm means extends outwardly through the steering gear housing means by way of a bearing assembly for the radial as well as the axially non-displaceable bearing support of the steering worm means, characterized in that the bearing assembly of the steering worm means is inserted into the narrow cylinder section and includes two adjusting ring means directly threadably connected with each other and each provided with an essentially radially extending abutment surface for the axial bearing support of the steering worm means, and in that detachable means are provided for the adjusting ring means for locking the same in the assembled condition.

2. A servo-mechanism according to claim 1, characterized in that the outer diameters of the adjusting ring means are at most equal to the inner diameter of the narrower cylinder section.

3. A servo-steering mechanism according to claim 2, characterized in that said detachable means is a lock nut.

4. A servo-steering system according to claim 2, characterized in that one of the adjusting ring means is provided with an external cylindrical centering surface which is inserted into a corresponding internal cylindrical centering surface of the narrow cylindrical section.

5. A servo-steering mechanism according to claim 4, characterized in that the internal cylindrical centering surface is constituted by an end opening for the narrow cylindrical section.

6. A servo-steering mechanism according to claim 4, characterized in that one of said adjusting ring means is provided with at least one of two parts consisting of external ring seal means and external cylindrical sealing surface means which cooperates with a corresponding one of parts consisting of counter-sealing surface means and ring seal means of the narrow cylindrical section, and in that said one adjusting ring means is provided on the side of its one of said parts facing the interior space of the narrow cylindrical section with a radially extending abutment surface means that abuts against a counter abutment surface of the narrow cylindrical section.

7. A servo-steering mechanism according to claim 6, characterized in that the detachable means for the mutual setting of the adjusting ring means are disposed in the interior space of the narrow cylindrical section.

8. A servo-steering mechanism according to claim 7, characterized in that said detachable means is a lock nut.

9. A servo-steering mechanism according to claim 1, characterized in that one of said adjusting ring means is provided with at least one of two parts consisting of external ring seal means and external cylindrical sealing surface means which cooperates with a corresponding one of parts consisting of counter-sealing surface means and ring seal means of the narrow cylindrical section, and in that said one adjusting ring means is provided on the side of its one of said parts facing the interior space of the narrow cylindrical section with a radially extending abutment surface means that abuts against a counter abutment surface of the narrow cylindrical section.

10. A servo-steering mechanism according to claim 1, characterized in that the detachable means for the mutual setting of the adjusting ring means are disposed in the interior space of the narrow cylindrical section.

11. A servo-steering system according to claim 1, characterized in that one of the adjusting ring means is provided with an external cylindrical centering surface which is inserted into a corresponding internal cylindrical centering surface of the narrow cylindrical section.

12. A servo-steering mechanism according to claim 11, characterized in that the internal cylindrical centering surface is constituted by an end opening for the narrow cylindrical section.

13. A servo-steering mechanism for vehicles comprising:
   steering gear housing means,
   working piston means,
   a steering shaft operatively connected to said working piston means,
   said housing means being constructed as a pressure medium cylinder which is subdivided into a wide cylinder section for housing a pressure medium and effective pressure surfaces of said working piston means which are acted upon by said pressure medium and an axially adjoining narrow cylinder section for slidably guiding said working piston means, wherein the inside diameter of said narrow cylinder section is substantially smaller than the inside diameter of the wide cylinder section,
   a steering worm means extending from an inner end portion within said housing means which is spirally movably connected with said working piston means to a coupling pin outer end portion disposed outside of said housing means,
   and a bearing assembly radially and axially non-displaceably supporting the steering worm means with respect to said housing means,
   wherein said steering shaft is supported in said narrow cylinder section of said housing means,
   wherein said coupling pin end portion of said steering worm means is disposed at the end of said housing means which is closest to said narrow cylinder section such that said narrow cylinder section is between said wide cylinder section and said coupling pin end portion, whereby the axial distance between said steering shaft and coupling pin is minimized,
   wherein said bearing assembly is positioned in the narrow cylinder section end of said housing means, and wherein said housing means is provided with a radially inwardly projecting abutment shoulder portion which faces in an axial direction away from said coupling pin end portion toward said narrow cylinder section and which engages with a radially outwardly projecting abutment portion of said bearing assembly to assist in precluding axial movement of said bearing assembly in a direction outwardly of said housing means toward said coupling pin end portion.

14. A servo-steering mechanism according to claim 13, wherein a ring seal is interposed between said housing means and said bearing assembly at a position axially outwardly in the direction toward said coupling pin end portion with respect to the engagement of the respective abutment portions.

15. A servo-steering mechanism according to claim 14, wherein the maximum radial dimension of said radially outwardly projecting abutment portion is less than the radial dimension of those portions of said narrow cylinder section in sliding engagement with said working piston means such that said bearing assembly is insertable into position through said narrow cylinder section.

16. A servo-steering mechanism according to claim 13, wherein the maximum radial dimension of said radially outwardly projecting abutment portion is less than the radial dimension of those portions of said narrow cylinder section in sliding engagement with said working piston means such that said bearing assembly is insertable into position through said narrow cylinder section.

17. A servo-steering mechanism for vehicles comprising:
   steering gear housing means,
   working piston means,
   a steering shaft operatively connected to said working piston means,
   said housing means being constructed as a pressure medium cylinder which is subdivided into a wide cylinder section for housing a pressure medium and effective pressure surfaces of said working piston means which are acted upon by said pressure medium and an axially adjoining narrow cylinder section for slidably guiding said working piston means, wherein the inside diameter of said narrow cylinder section is substantially smaller than the inside diameter of the wide cylinder section,
   a steering worm means extending from an inner end portion within said housing means which is spirally movably connected with said working piston means to a coupling pin outer end portion disposed outside of said housing means,
   and a bearing assembly radially and axially nondisplaceably supporting the steering worm means with respect to said housing means,
   wherein said steering shaft is supported in said narrow cylinder section of said housing means,
   wherein said coupling pin end portion of said steering worm means is disposed at the end of said housing means which is closest to said narrow cylinder section, whereby the axial distance between said steering shaft and coupling pin is minimized,
   wherein the bearing assembly is inserted into the narrow cylinder section and includes two adjusting ring means directly threadably connected with each other, each of said adjusting ring means being provided with an essentially radially extending abutment surface for engaging with corresponding radially extending abutment surfaces of the housing means for axially supporting the steering worm means, and wherein detachable locking means are provided for locking the adjusting ring means in the assembled condition.

* * * * *